(12) United States Patent
Sasaki

(10) Patent No.: US 7,782,415 B2
(45) Date of Patent: Aug. 24, 2010

(54) ACTIVE MATRIX SUBTRATE, LIQUID CRYSTAL DISPLAY PANEL AND METHOD OF MANUFACTURING THE SAME

(75) Inventor: Takeshi Sasaki, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 315 days.

(21) Appl. No.: 12/078,765

(22) Filed: Apr. 4, 2008

(65) Prior Publication Data

US 2008/0252836 A1 Oct. 16, 2008

(30) Foreign Application Priority Data

Apr. 11, 2007 (JP) .............................. 2007-104179

(51) Int. Cl.
*G02F 1/136* (2006.01)
(52) U.S. Cl. ....................................................... 349/43
(58) Field of Classification Search .................... 349/43
See application file for complete search history.

(56) References Cited

U.S. PATENT DOCUMENTS

2009/0021658 A1* 1/2009 Takeuchi et al. .............. 349/37
2010/0020283 A1* 1/2010 Suzuki ......................... 349/141
2010/0039601 A1* 2/2010 Kim et al. ................... 349/144

FOREIGN PATENT DOCUMENTS

JP      2004-280130       10/2004

* cited by examiner

*Primary Examiner*—Sung H Pak
(74) *Attorney, Agent, or Firm*—McGinn IP Law Group, PLLC

(57) ABSTRACT

Disclosed is an active matrix substrate including a substrate, a gate wiring formed on the substrate, a data wiring formed on the substrate so as to cross the gate wiring, a common wiring formed on the substrate extending approximately parallel to the gate wiring, a pixel formed in a region surrounded by the gate wiring and the data wiring, and a switching element formed in a vicinity of an intersection of the gate wiring and the data wiring. The pixel includes a pixel electrode, and a counter electrode arranged alternately with the pixel electrode and connected to the data wiring. The switching element includes a first electrode connected to the common wiring, and a second electrode connected to the pixel electrode.

11 Claims, 10 Drawing Sheets ness, light-weight and low power consumption. This LCD device includes an LCD panel and a backlight unit which supplies backlight to the LCD panel, in which a liquid crystal is sandwiched between a TFT substrate and an opposed substrate. The opposed substrate is generally provided with a color filter and a black matrix while the TFT substrate is provided with switching elements such as TFTs (Thin Film Transistors) in a matrix pattern.

ACTIVE MATRIX SUBTRATE, LIQUID CRYSTAL DISPLAY PANEL AND METHOD OF MANUFACTURING THE SAME

INCORPORATION BY REFERENCE

This application is based upon and claims the benefit of priority from Japanese Patent Application No. 2007-104179, filed on Apr. 11, 2007, the disclosure of which is incorporated herein in its entirety by reference.

BACKGROUND OF THE INVENTION

1. Technical Field

The invention relates to an active matrix substrate and a liquid crystal display (LCD) panel and in particular, relates to an active matrix substrate on a TFT substrate in which both pixel electrodes and counter electrodes are formed on the TFT substrate, and an In Plane Switching (IPS) type LCD panel with the TFT substrate having the active matrix substrate.

2. Background Art

A liquid crystal display (LCD) device is widely used as a display device of an audio visual equipment and an office automation equipment in view of such advantages of thinness, light-weight and low power consumption. This LCD device includes an LCD panel and a backlight unit which supplies backlight to the LCD panel, in which a liquid crystal is sandwiched between a TFT substrate and an opposed substrate. The opposed substrate is generally provided with a color filter and a black matrix while the TFT substrate is provided with switching elements such as TFTs (Thin Film Transistors) in a matrix pattern.

Generally, operation mode of the liquid crystal display device is classified into a TN (Twisted Nematic) type and an IPS type. In the TN type, a major axis direction of an aligned liquid crystal molecule (hereinafter, referred to an LC director) is rotated in a plane vertical to the TFT substrate, while the IPS type rotates the LC director in a plane parallel to the TFT substrate.

In the IPS type LCD panel, each pixel electrode and each counter electrode are arranged to be parallel to each other and alternately formed on the TFT substrate. The LC director molecule is changed by applying a voltage between the pixel and counter electrodes and forming an electric field parallel to the substrate surface, and thus quantity of transmitted light is controlled. In the IPS type, since the LC director rotates in a plane parallel to the substrate surface, it enables to avoid such a problem in the TN type that relation between quantity of the transmitted light and the applied voltage is greatly different when seeing from the direction of the LC director and when seeing from the normal direction to the TFT substrate. In the IPS type, therefore, a wide range of viewing angle can be obtained. (See, for example, JP-2004-280130.)

However, in the IPS type LCD device, the liquid crystal molecule rotates only in one direction, and causes a problem that coloring occurs when seeing from an oblique direction in a white display state. In order to solve this problem, the pixel electrode and the common electrode are designed to have bended configuration, respectively, in one pixel.

FIG. 8 is a plan view which typically indicates a structure of one pixel in the TFT substrate included in the IPS type LCD device of the related art.

As shown in FIG. 8, the TFT substrate of the related art includes: a gate wiring 11 which extends in the horizontal direction in the drawing sheet, a common wiring (a so-called COM wiring) 12 neighboring the gate wiring almost parallel thereto, a data wiring 13 which extends in a direction approximately orthogonal to the gate wiring 11, a TFT 16 disposed in a vicinity of a crossing point of the gate wiring 11 and the data wiring 13, a line-shaped pixel electrode 14 and a counter electrode 15 almost parallel to the data wiring 13 disposed in a region surrounded by the gate wiring 11 and the data wiring 13, and a shield common wirings 20 neighboring to both sides of the data wiring 13, shielding a leakage electric field from the data wiring 13, and having a function of the counter electrode 15.

The counter electrode 15 is connected to the common wiring 12. The pixel electrode 14 is connected to the data wiring 13 via the TFT 16. The counter electrode 15 and the pixel electrode 14 are arranged alternately with a predetermined interval and bended in order to reduce the coloring. Moreover, a domain stabilization electrode 17 which extends in the direction of the gate wiring 11 is formed at each of the bended points. A reverse-rotation prevention structure 18 that regulates the direction of rotation of the liquid crystal molecule is formed at each end of the counter electrode 15 and the pixel electrode 14.

The above-mentioned TFT substrate is manufactured by using the following steps as shown in FIG. 10.

A metal film is formed on a glass substrate (Step B1). A gate wiring 11, a gate electrode, a common wiring 12, a counter electrode 15 and a shield common wiring 20 are patterned from the metal film by using a photolithography (Step B2).

A gate insulation film and a semiconductor layer are successively formed to cover the previously patterned film (Step B3). The semiconductor layer is then patterned into a predetermined shape by using the photolithography (Step B4).

A metal film is formed and patterned into a data wiring 13, a source/drain electrode of a TFT 16 and a pixel electrode 14 by using the photolithography such that the source electrode of the TFT 16 is connected to the data wiring 13 while the drain electrode of the TFT 16 is connected to the pixel electrode 14 (Step B5).

A passivation insulating film is formed to cover a previously patterned film (Step B6). A contact hole is there formed at needed locations thereof by using the photolithography (Step B7). In this example, however, the contact hole is not shown in the drawing since the related art illustrates a structure that does not require it at the pixel area. The contact hole would be needed in a peripheral circuit area besides the pixel area.

An operation of the IPS type LCD panel will be described referring to FIG. 8. By applying an ON voltage to a selected gate wiring 11 the TFT 16 associated with the gate wiring 11 is turned on to apply a signal voltage to each pixel electrode 14 from the data wiring 13.

A common voltage (so-called COM voltage) is always applied to the counter electrode 15, and thus an electric potential difference between the pixel electrode 14 and the counter electrode 15 is accumulated and maintained in a storage capacity part (a storage 19 in FIG. 8) and a liquid crystal capacity. The storage capacity is formed by overlapping the pixel electrode 14 and the counter electrode 15 via an insulating film. The liquid crystal capacity is formed in the liquid crystal part between the pixel electrode 14 and the counter electrode 15.

The gate wiring 11 is changed to an OFF voltage, then the pixel electrode 14 is electrically disconnected from the data wiring 13, and turns into a floating state with respect to the counter electrode 15 owing to capacity coupling performed by the storage capacity and liquid crystal capacity.

Since the counter electrode 14 is always in the predetermined common potential and the pixel voltage is maintained to the signal voltage when put in the transistor ON state, the electric potential difference applied to the liquid crystal at the selected pixel is also maintained, and a directional change state of the liquid crystal molecule caused by applying the ON voltage to the selected gate wiring can be maintained.

In the IPS type LCD device, however, a horizontal or lateral electric field between the pixel electrode and the counter electrode is affected by other electric potential in the neighborhood to change the electric field strength and causes unstable display state. To improve the display state, the shield common wiring is provided aside of the data wiring. An area utilized as an opening in a pixel becomes small, and causes a problem that an aperture ratio (a ratio of the area of the opening to the area of the pixel) decreases.

In addition, since the data wiring is not an electrode of which the pixel opening is composed, the area utilized as the opening becomes smaller, and further the aperture ratio decreases.

SUMMARY

An exemplary object of the invention is to provide an active matrix substrate or a TFT substrate with improved aperture ratio and an IPS type LCD panel having the TFT substrate.

An active matrix substrate according to an exemplary aspect of the invention includes a substrate, a gate wiring formed on the substrate, a data wiring formed on the substrate so as to cross the gate wiring, a common wiring formed on the substrate extending approximately parallel to the gate wiring, a pixel formed in a region surrounded by the gate wiring and the data wiring, and a switching element formed in a vicinity of an intersection of the gate wiring and the data wiring. The pixel includes a pixel electrode, and a counter electrode arranged alternately with the pixel electrode and connected to the data wiring. The switching element includes a first electrode connected to the common wiring, and a second electrode connected to the pixel electrode.

A liquid crystal display panel of an in plane switching type according to another aspect of the invention includes an active matrix substrate, an opposed substrate opposing to the active matrix substrate, and a liquid crystal sandwiched between the active matrix substrate and the opposed substrate. The active matrix substrate includes a substrate, a gate wiring formed on the substrate, a data wiring formed approximately orthogonal to the gate wiring, a common wiring formed approximately parallel to the gate wiring, the pixel formed in a region surrounded by the gate wiring and the data wiring, and a switching element formed in a vicinity of an intersection of the gate wiring and the data wiring. The pixel includes a pixel electrode, and a counter electrode arranged alternately with the pixel electrode and connected to the data wiring. The switching element includes a first electrode connected to the common wiring, and a second electrode connected to the pixel electrode.

A method of manufacturing the active matrix substrate according to yet another aspect of the invention includes forming a gate wiring including a gate electrode, a common wiring approximately parallel to the gate wiring, and a pixel electrode approximately orthogonal to the common wiring on a substrate; and forming a data wiring approximately parallel to the pixel electrode and passing a vicinity of the gate electrode, a counter electrode connected to the data wiring and arranged alternately with the pixel electrode, and a switching element having a first electrode connected to the common wiring and a second electrode connected to the pixel electrode.

BRIEF DESCRIPTION OF THE DRAWINGS

Exemplary features and advantages of the invention will become apparent from the following detailed description when taken with the accompanying drawings in which.

EXEMPLARY EMBODIMENT

Figure 1:
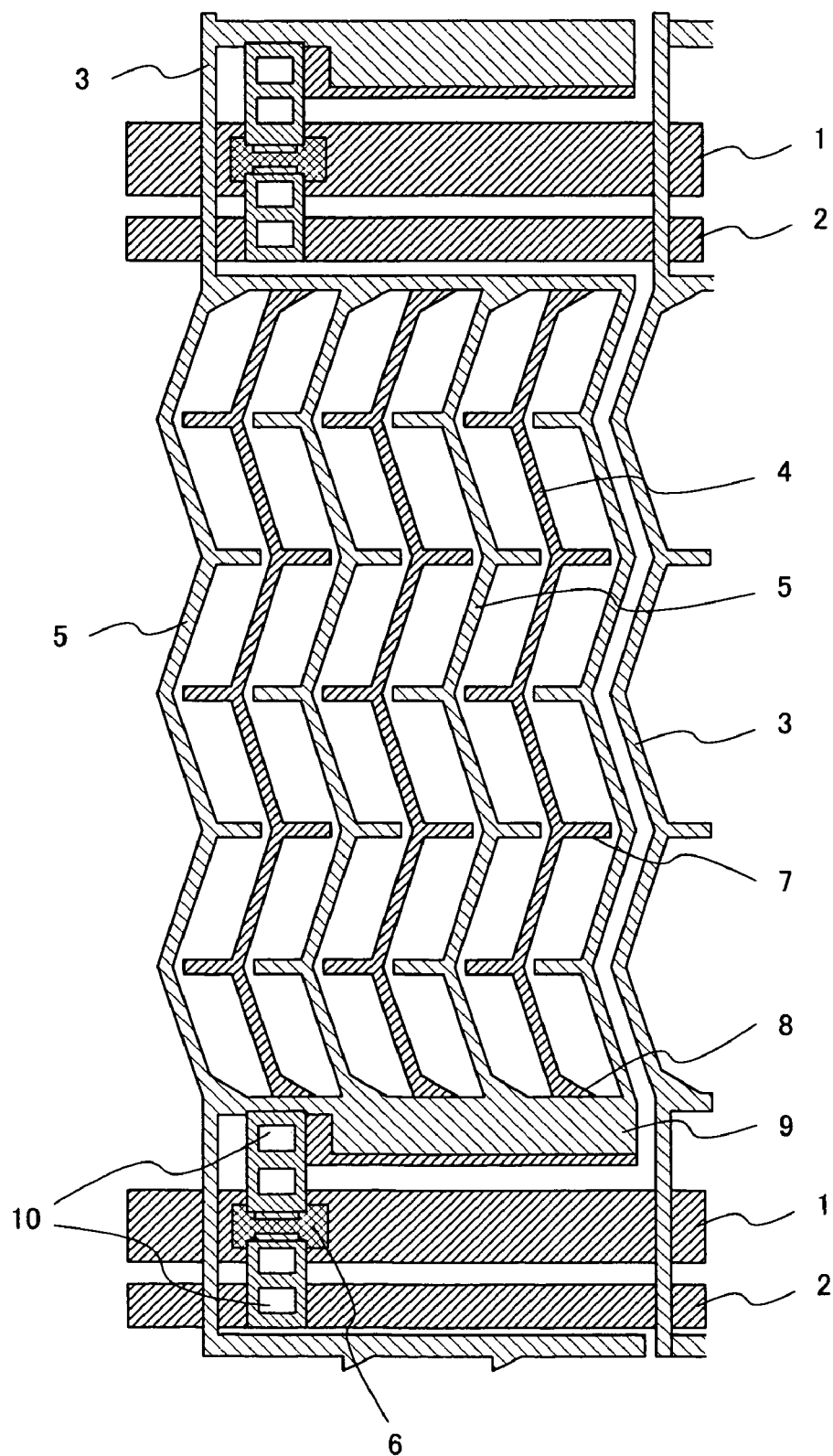
FIG. 1 is a plan view illustrating a pixel of a TFT substrate in an IPS type LCD panel according to a first exemplary embodiment.

Exemplary embodiments of the invention will now be described in detail in accordance with the accompanying drawings.

Exemplary Embodiment 1

An active matrix substrate according to a first exemplary embodiment and an IPS type LCD panel having the active matrix substrate or TFT substrate will be described with reference to FIG. 1.

The LCD device includes an LCD panel in which a liquid crystal is sandwiched between an active matrix substrate and an opposed substrate, and a backlight unit. The active matrix substrate (a TFT substrate) of this exemplary embodiment, as shown in FIG. 1, includes a gate wiring (a scanning line) 1 which extends in the horizontal direction in the drawing sheet, a common wiring (a COM wiring) 2 neighboring almost parallel to the gate wiring 1 and a data wiring (a signal line) 3 which extends in the direction approximately orthogonal to the gate wiring 1, a switching element of the TFT 6 disposed in a vicinity of a point of intersection of the gate wiring 1 and the data wiring 3, and a line-shaped pixel electrode 4 and a counter electrode 5 parallel to the data wiring 3 disposed in a region surrounded by the gate wiring 1 and the data wiring 3. The pixel electrode 4 and the counter electrode 5 are alternately arranged with a predetermined interval.

Figure 8:
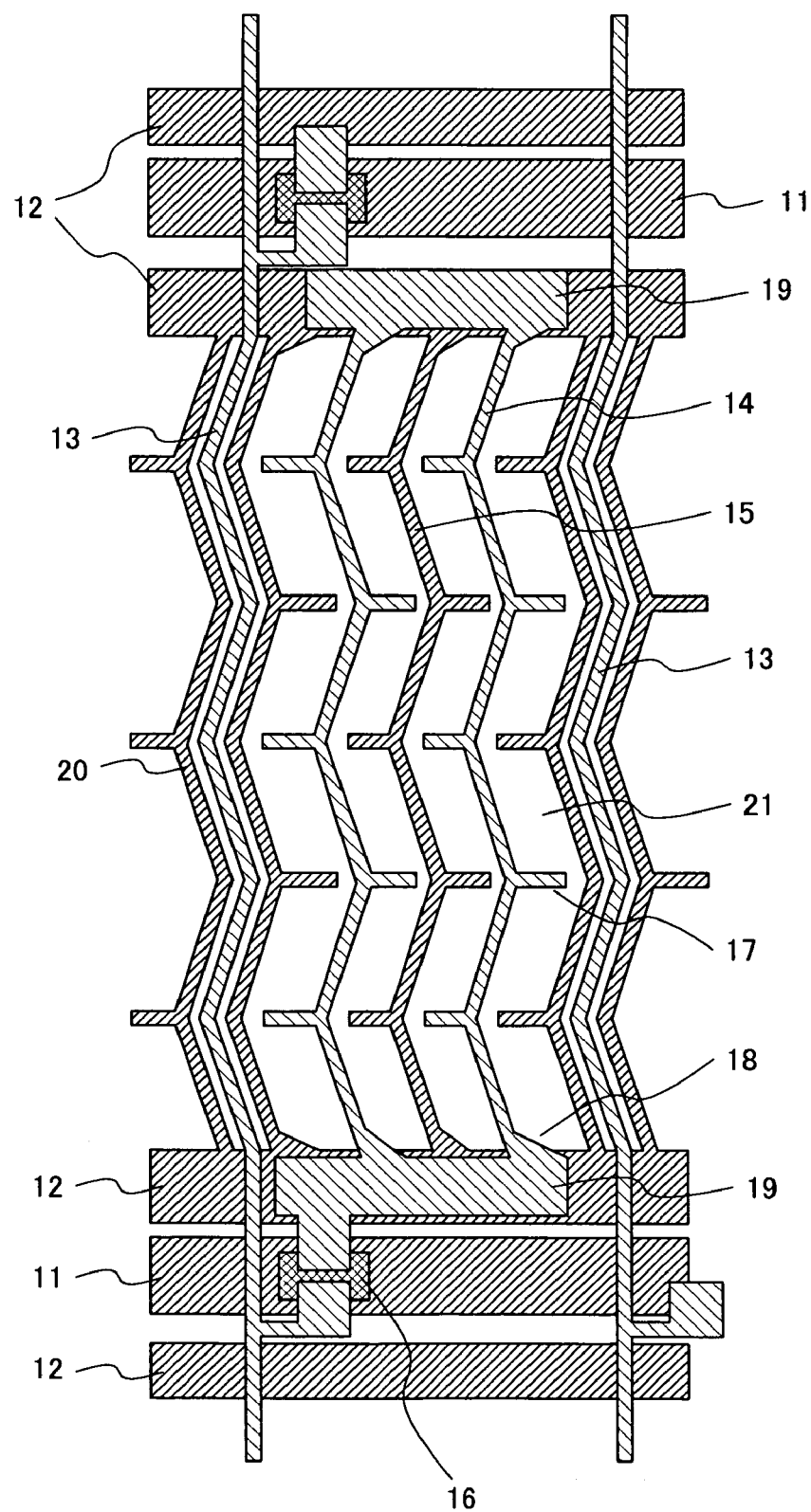
FIG. 8 is a plan view illustrating a pixel of the TFT substrate in an IPS type LCD panel of the related art.

In the TFT substrate of the related art, as shown in FIG. 8, the counter electrode 15 is connected to the common wiring 12, and the pixel electrode 14 is connected to the data wiring 13 via the TFT 16. In the TFT substrate of the related art, since the electric field strength changes by leakage electric field from the data signal, a shield common wiring is provided aside of the data wiring. Since the data wiring itself is not an electrode of which an opening is composed, an area utilized as the opening becomes small. Accordingly, there is a problem that the aperture ratio decreases.

Accordingly, in this exemplary embodiment, one electrode (in this exemplary embodiment, the source electrode) of the TFT 6 is connected to the common wiring 2, and other electrode (in this exemplary embodiment, the drain electrode) is connected to the pixel electrode 4. The counter electrode 5 is connected to the data wiring 3. That is, the common voltage is applied to the pixel electrode.

Figure 9:
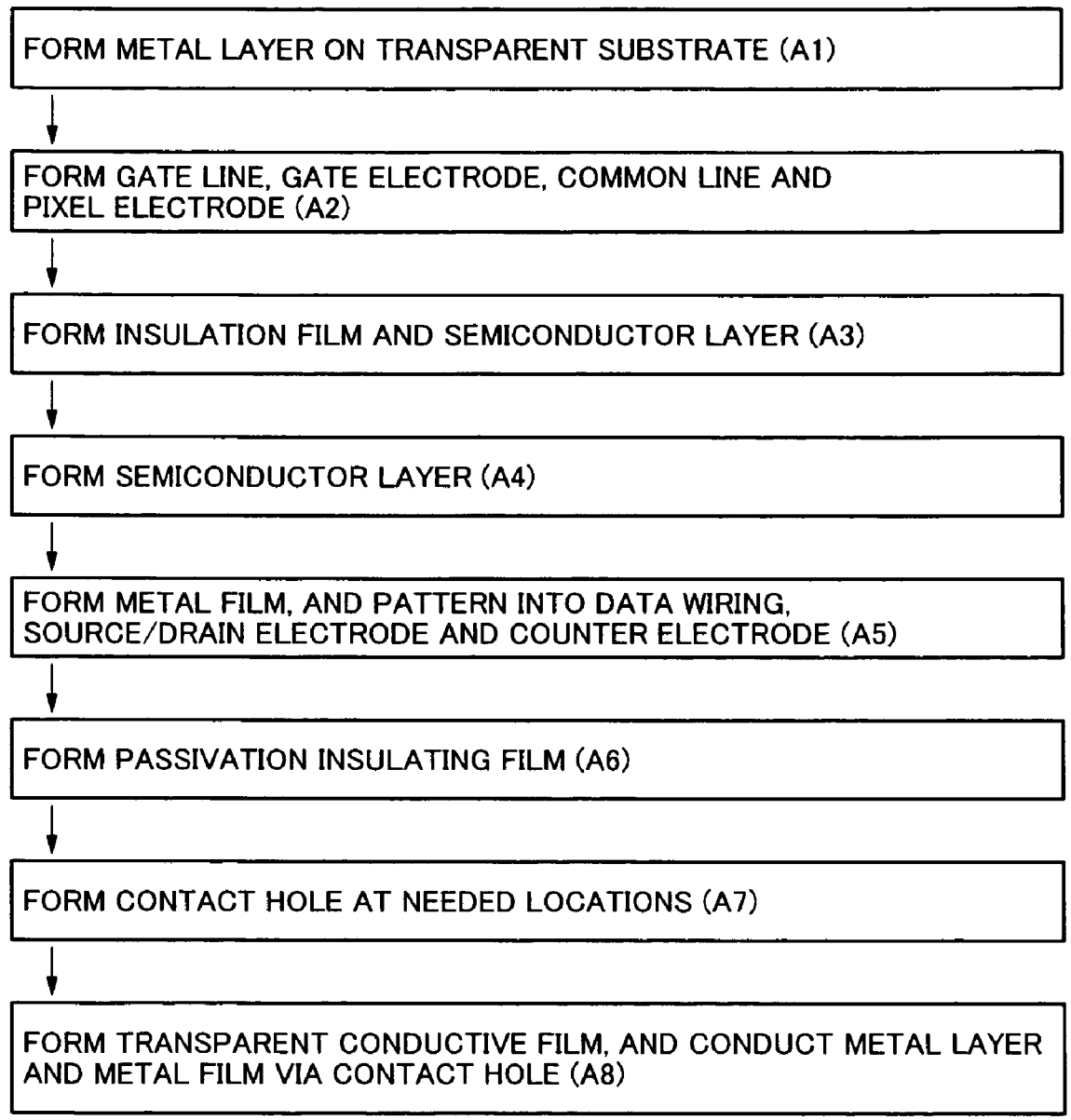
FIG. 9 is a flow chart illustrating a manufacturing procedure of the TFT substrate in the IPS type LCD panel according to an exemplary embodiment.
Figure 10:
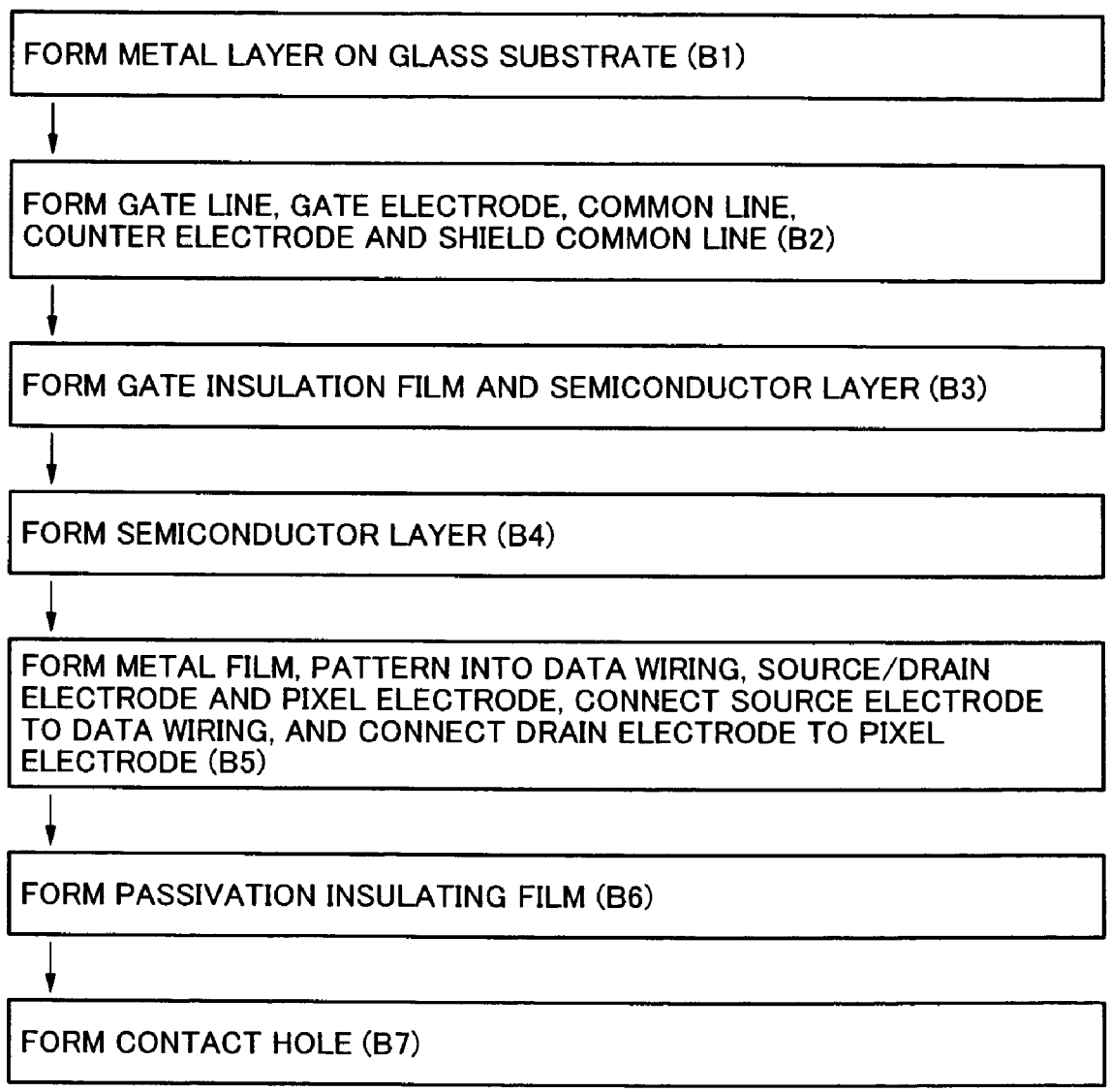
FIG. 10 is a flow chart illustrating a manufacturing procedure of the TFT substrate in the IPS type LCD panel of the related art.

Hereinafter, the method of manufacturing the TFT substrate of aforementioned structure will be described specifically with reference to FIG. 9.

A metal layer such as chromium (Cr) is formed by using the sputtering method or the like on a transparent substrate such as glass or plastics (Step A1). A gate wiring 1, a gate electrode, a common wiring 2 and a pixel electrode 4 are patterned by using the photolithography (Step A2).

A gate insulation film such as a silicon oxide film or a silicon nitride film and a semiconductor layer such as amorphous silicon or polysilicon are successively formed to cover the previously patterned film (Step A3). The semiconductor layer is then patterned into a predetermined shape by using the photolithography (Step A4).

A metal film such as Cr is formed by using sputtering method or the like and patterned into a data wiring 3, a source/drain electrode and a counter electrode 5 by using the photolithography (Step A5).

A passivation insulating film such as a silicon oxide film or a silicon nitride film is formed on the metal film by using the plasma CDV method or the like (Step A6). The contact hole 10 is then formed at needed locations thereof by using the photolithography (Step A7).

A transparent conductive film such as an indium tin oxide (ITO) is formed on the insulating film, and patterned into a connecting to connect the metal layer and the metal film via the contact hole 10 by using the photolithography (Step A8). The material used for the conducting is not limited to the transparent conductive film such as ITO. The contact hole may be formed in the insulation film before forming the metal film without using the uppermost layer, and the metal layer and the metal film may be conducted directly.

In case of the above TFT substrate, the TFT 6 connected to the gate wiring is changed into the conductive state by applying an ON voltage to the gate wiring 1, and the common voltage is applied to each pixel electrode 4.

An electric potential difference is generated between the pixel electrode 4 and the counter electrode 5 connected to the data, wiring 3 by applying a voltage signal corresponding to an image data to the data wiring 3. The electric potential difference is accumulated and maintained in the storage capacity part (the storage 9) where the pixel electrode 4 and the counter electrode 5 are laminated via the insulating film and in the capacity of the liquid crystal part between the pixel electrode 4 and the counter electrode 5, the liquid crystal capacity.

The pixel electrode 4 is electrically disconnected from the common wiring 2 and turned into a floating state in which a capacity coupling is performed by the storage capacity and the liquid crystal capacity with respect to the counter electrode 5 by changing the gate wiring 1 to an OFF voltage.

When the data wiring voltage is changed in this state, the pixel voltage also changes. However, the electric potential difference between the counter electrode 5 and the pixel electrode 4 is maintained, then the voltage applied to the liquid crystal is also maintained, and a directional change state with the superimposed voltage can be maintained.

The common voltage is applied to the pixel electrode 4, and the data wiring 3 and the counter electrode 5 are in the same electric potential. A leakage electric field from the data signal does not affect the direction of the liquid crystal molecule even if the conventional shield common wiring is not provided. Since the data wiring 3 acts as the counter electrode 5, one of the conventional counter electrodes 5 can be omitted. An area of an opening can be enlarged to improve the aperture ratio.

Needless to say, FIG. 1 is an exemplification. Insofar as the pixel electrode 4 is formed in the same layer as the gate wiring 1 and the common wiring 2, and the counter electrode 5 is formed in the same layer as the data wiring 3, while the common wiring 2 is connected to the source electrode of the TFT 6, the pixel electrode 4 is connected to the drain electrode, and the counter electrode 5 is connected to the data wiring 3, shape, arrangement, quantity or material of each wiring and electrode can be changed appropriately.

Exemplary Embodiment 2

An active matrix substrate and an IPS type LCD panel having the active matrix substrate according to a second exemplary embodiment will be described with reference to FIG. 2.

Figure 2:
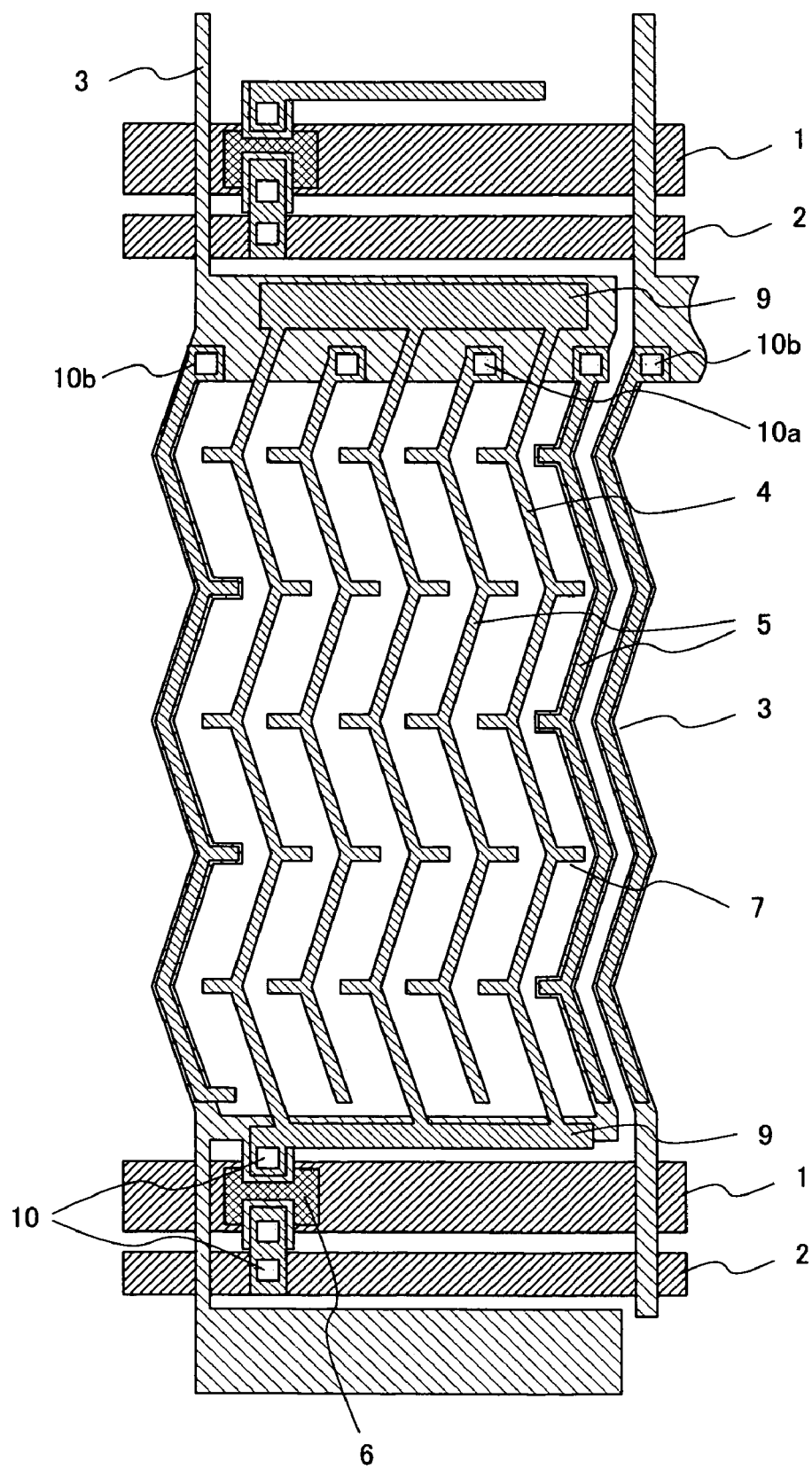
FIG. 2 is a plan view illustrating a pixel of the TFT substrate in the IPS type LCD panel according to a second exemplary embodiment.

As shown in FIG. 2, the pixel electrode 4 and the counter electrode 5 are made of a conductive film (transparent conductive film such as ITO) of the uppermost layer (upper than the gate wiring 1, the common wiring 2 and the data wiring 3).

In this exemplary embodiment, the storage capacity includes the upper part storage electrode (the electrode on the upper layer side of the storage 9) connected to the pixel electrode 4 and the lower part storage electrode (the electrode on the lower layer side of the storage 9) connected to the data wiring 3.

The counter electrode 5 is connected to the lower part storage electrode via the contact hole 10a, the counter electrode is in the same electric potential as the data wiring 3. In order to form a group of counter electrodes 5 on the same layer, the counter electrode 5 with the same shape as the data wiring 3 is provided on the data wiring 3, and the data wiring 3 and the counter electrode 5 are connected via the contact hole 10b.

The common voltage is applied to the pixel electrode 4, while the data wiring 3 and the counter electrode 5 are in the same electric potential. A leakage electric field from the data signal does not affect the direction of the liquid crystal molecule even if the conventional shield common wiring is not provided. Since the data wiring 3 acts as the counter electrode 5, one of the conventional counter electrodes 5 can be omitted. An area of an opening can be enlarged to improve the aperture ratio.

The counter electrode 5 made of the conductive film of the uppermost layer on the data wiring 3 is not necessarily required. The conductive film of the uppermost layer is not limited to the transparent conductive film such as ITO. FIG. 2 is an exemplification. Insofar as the pixel electrode 4 and the counter electrode 5 are made of the conductive film of the uppermost layer, and the common wiring 2 and the pixel electrode 4 are connected to the source and drain electrodes of the TFT 6, respectively, while the counter electrode 5 is connected to the data wiring 3, shape arrangement, quantity or material of each wiring and electrode may be changed appropriately.

Exemplary Embodiment 3

An active matrix substrate and an IPS type LCD panel having the active matrix substrate according to a third exemplary embodiment will be described with reference to FIG. 3.

Figure 3:
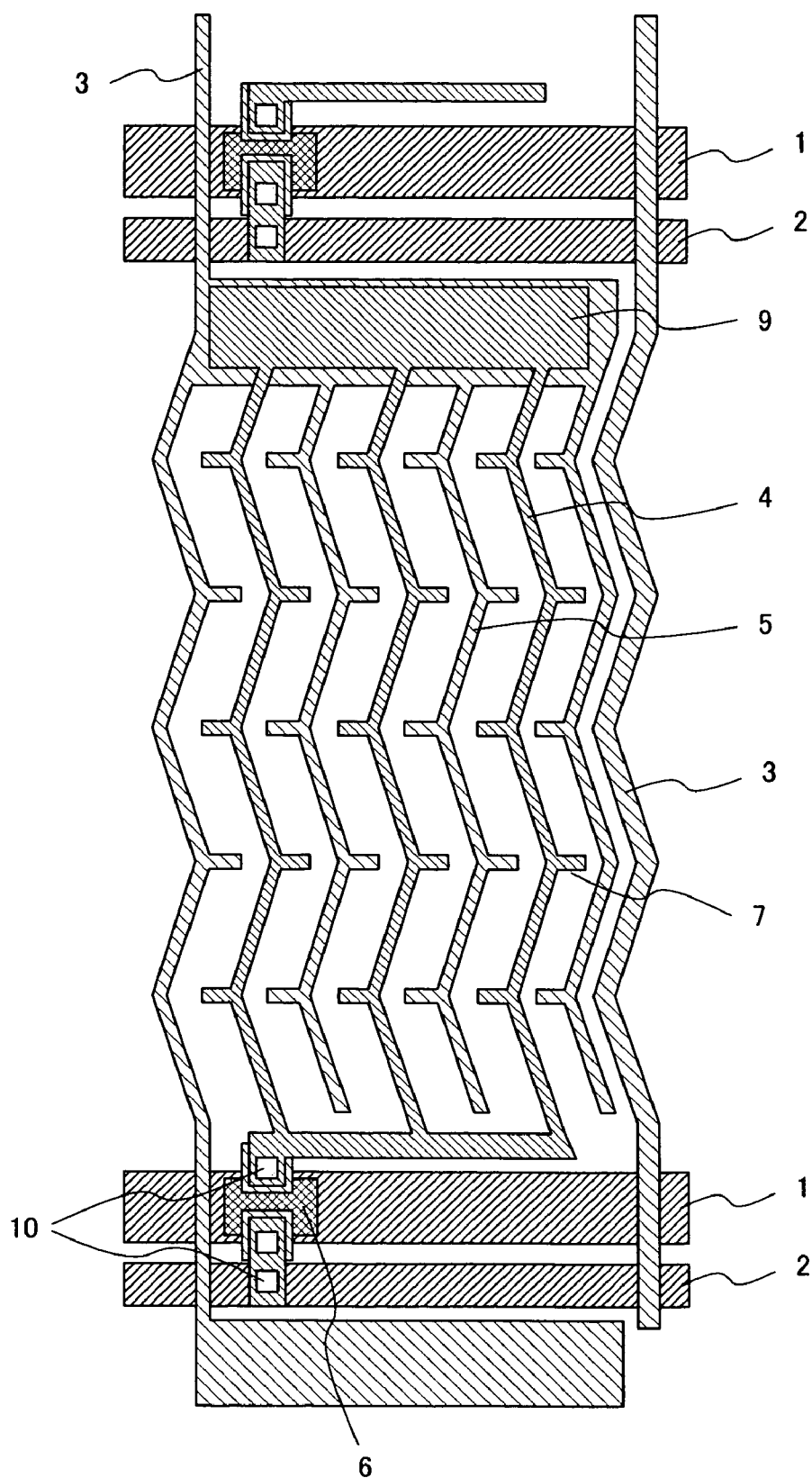
FIG. 3 is a plan view illustrating a pixel of the TFT substrate in the IPS type LCD panel according to a third exemplary embodiment.

As shown in FIG. 3, the pixel electrode 4 is made of a conductive film (transparent conductive film such as ITO) of the uppermost layer (upper than the gate wiring 1, the common wiring 2 and the data wiring 3) and the counter electrode 5 is made of the metal film. The above-mentioned pixel electrode is connected to the drain electrode via the contact hole.

The common voltage is applied to the pixel electrode 4, and the data wiring 3 and the counter electrode 5 are in the same electric potential, a leakage electric field from the data signal does not affect the direction of the liquid crystal molecule even if the conventional shield common wiring is not provided. Since the data wiring 3 acts as the counter electrode 5, one of the counter electrodes 5 can be omitted. An area of an opening can be enlarged to improve the aperture ratio.

The counter electrode 5 and the lower part storage electrode are in the same layer, a contact hole (contact holes 10a and 10b in FIG. 2) is not necessary in the storage part. The storage capacity and the aperture ratio can be enlarged further compared with the second exemplary embodiment.

FIG. 3 is an exemplification. Insofar as the pixel electrode 4 is made of a conductive film of the uppermost layer, the counter electrode 5 is formed in the same layer as the data wiring 3, and the common wiring 2 and the pixel electrode 4 are connected to the source and drain electrodes of the TFT 6, respectively, while the counter electrode 5 is connected to the data wiring 3, shape, arrangement, quantity or material of each wiring and the pole can be changed appropriately.

Exemplary Embodiment 4

An active matrix substrate and an IPS type LCD panel having the active matrix substrate according to a fourth exemplary embodiment will be described with reference to FIG. 4.

Figure 4:
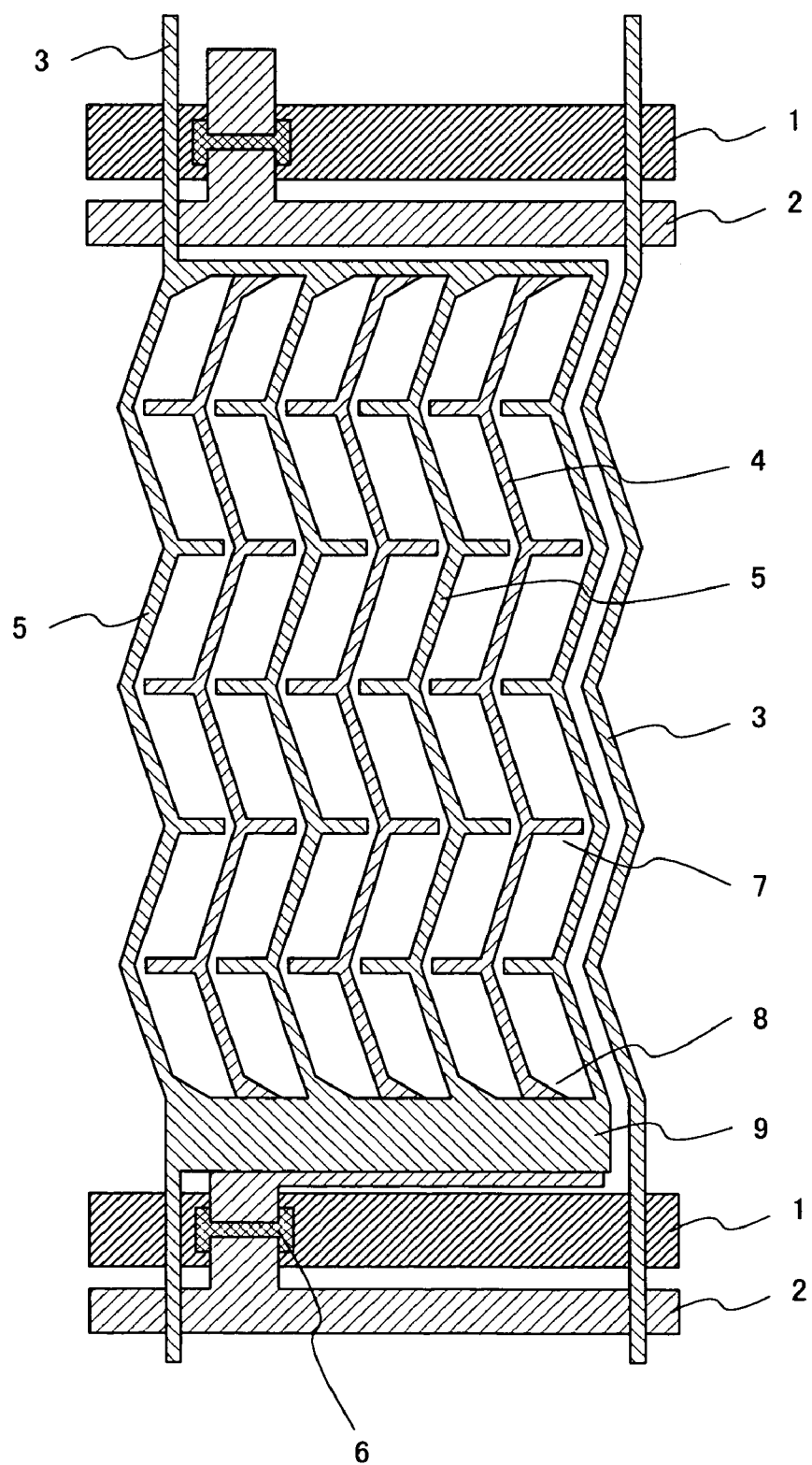
FIG. 4 is a plan view illustrating a pixel of the TFT substrate in the IPS type LCD panel according to a fourth exemplary embodiment.

As shown in FIG. 4, in the structure of the first exemplary embodiment, the common wiring 2 is provided in a layer different from the metal layer (in this exemplary embodiment, between the metal layer and the metal film).

The common voltage is applied to the pixel electrode 4, and the data wiring 3 and the counter electrode 5 are the same electric potential, a leakage electric field from the data signal does not affect the direction of the liquid crystal molecule even if the conventional shield common wiring is not provided. Since the data wiring 3 acts as the counter electrode 5, one of the counter electrodes 5 can be omitted. An area of an opening can be enlarged to improve the aperture ratio.

In this exemplary embodiment, the source electrode of the TFT 6 and the common wiring 2 may be formed in the same layer, and a contact hole (contact hole 10 of FIG. 1) may be omitted. This exemplary embodiment can be realized easily.

The metal film may be provided in the upper layer of the metal layer, and the metal film may be lower than the lower layer of the common wiring. FIG. 4 is an exemplification. Insofar as the pixel electrode 4 is formed in the same layer as the common wiring 2, the counter electrode 5 is formed in the same layer as the data wiring 3, and the common wiring 2 and the pixel electrode 4 are connected to the source and drain electrodes of the TFT 6, respectively, while the counter electrode 5 is connected to the data wiring 3, shape, arrangement, quantity or material of each wiring and electrode may be changed appropriately.

Exemplary Embodiment 5

An active matrix substrate and an IPS type LCD panel having the active matrix substrate according to a fifth exemplary embodiment will be described with reference to FIG. 5.

Figure 5:
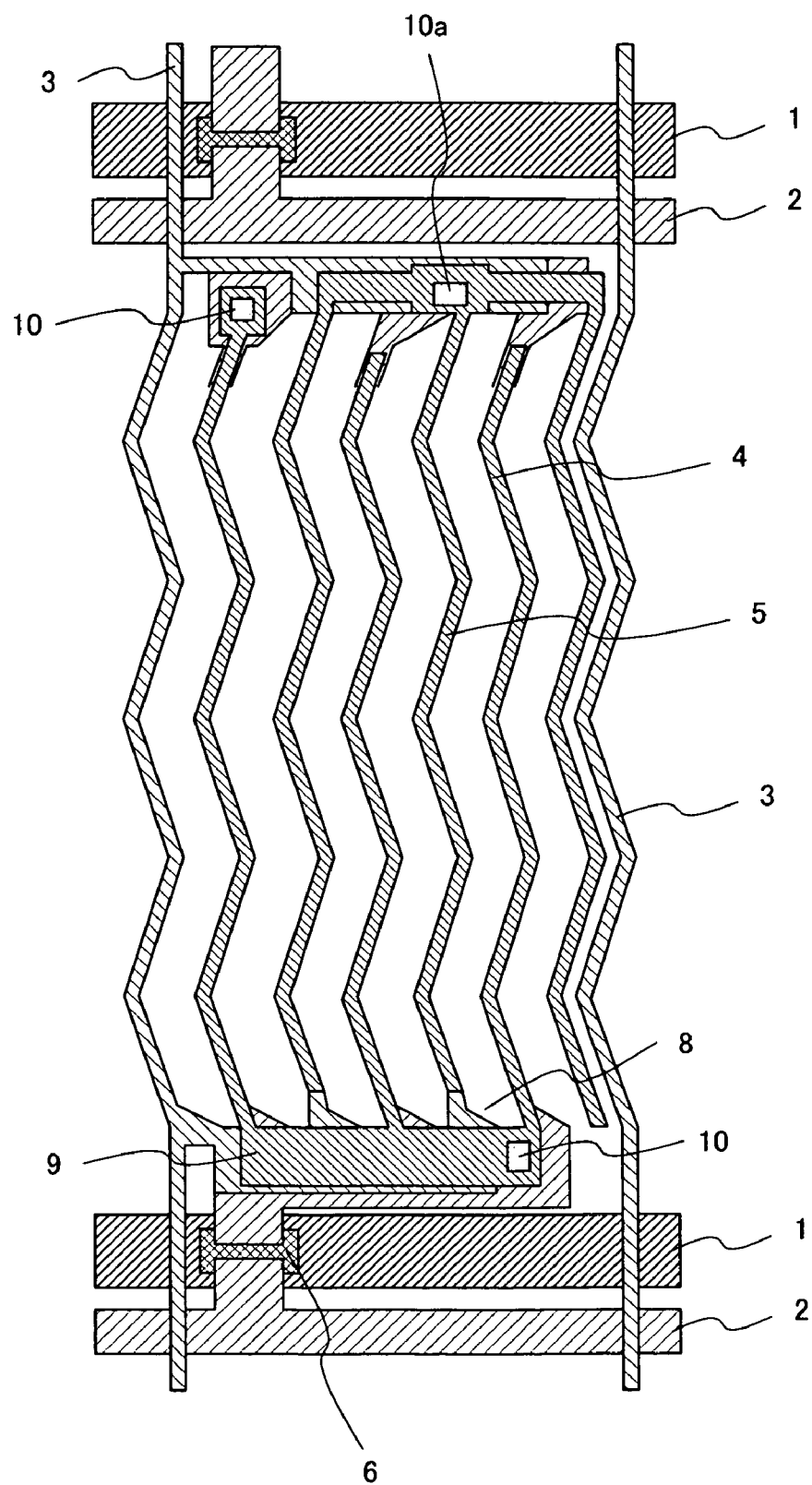
FIG. 5 is a plan view illustrating a pixel of the TFT substrate in the IPS type LCD panel according to a fifth exemplary embodiment.

As shown in FIG. 5, the common wiring 2 is provided in the layer (in this exemplary embodiment, between the metal layer and the metal film) different from the metal layer in the second exemplary embodiment.

The common voltage is applied to the pixel electrode 4, and the data wiring 3 and the counter electrode 5 is in the same electric potential, a leakage electric field from the data signal does not affect the direction of the liquid crystal molecule even if the conventional shield common wiring is not provided. Since the data wiring 3 acts as the counter electrode 5, one of the counter electrodes 5 can be omitted. An area of an opening large can be enlarged to improve the aperture ratio.

In this exemplary embodiment, the source electrode of the TFT 6 and the common wiring 2 can be formed at the same layer, and the contact hole can be omitted partly. This exemplary embodiment can be realized easily. The pixel electrode and the counter electrode are connected to the drain electrode and the data wiring via the contact hole, respectively.

FIG. 5 is an exemplification. Insofar as the pixel electrode 4 and the counter electrode 5 are formed in the uppermost layer, and the common wiring 2 and the pixel electrode 4 are connected to the source and drain electrodes of the TFT 6, respectively, while the counter electrode 5 is connected to the data wiring 3, shape, arrangement, quantity or material of each wiring and electrode can be changed appropriately.

Exemplary Embodiment 6

An active matrix substrate and an IPS type LCD panel having the active matrix substrate according to the sixth exemplary embodiment will be described with reference to FIG. 6.

Figure 6:
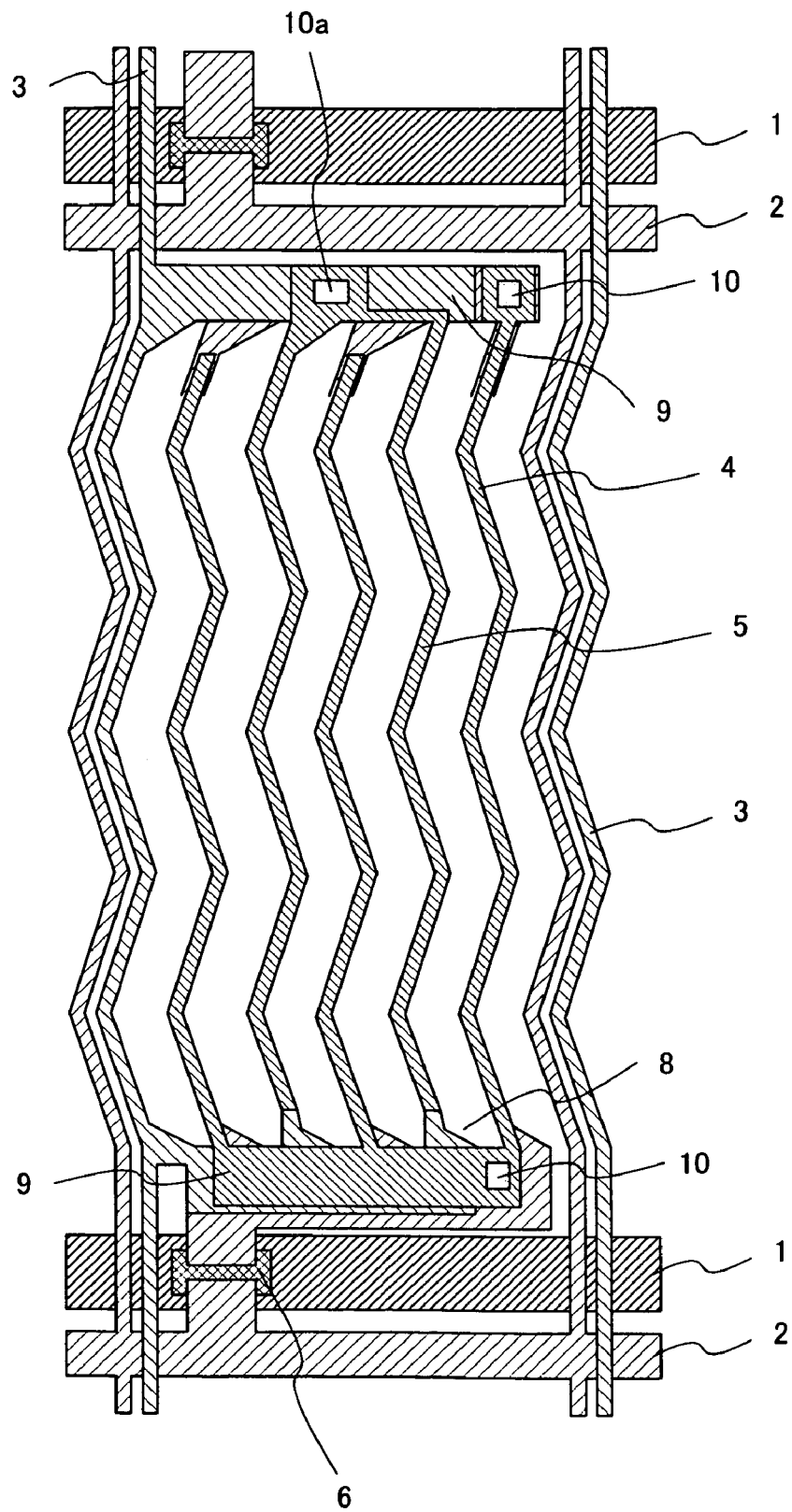
FIG. 6 is a plan view illustrating a pixel of the TFT substrate in the IPS type LCD panel according to a sixth exemplary embodiment.

As shown in FIG. 6, the common wirings 2 of the fifth exemplary embodiment are connected in the longitudinal direction, and the COM voltage supply capacity is reinforced.

Since the common voltage is applied to the pixel electrode 4, and the data wiring 3 and the counter electrode 5 are in the same electric potential, a leakage electric field from the data signal does not affect the direction of the liquid crystal molecule even if the conventional shield common wiring is not provided. Since the data wiring 3 acts as the counter electrode 5, one of the counter electrodes 5 can be omitted. The area of the opening can be enlarged to improve the aperture ratio.

FIG. 6 is an exemplification. Insofar as the pixel electrode 4 and the counter electrode 5 are formed in the uppermost layer, and the common wiring 2 and the pixel electrode 4 are connected to the source and drain electrodes of the TFT 6, respectively, while the counter electrode 5 is connected to the data wiring 3, shape, arrangement, quantity or material of each wiring and electrode can be changed appropriately.

Exemplary Embodiment 7

An active matrix substrate and an IPS type LCD panel having the active matrix substrate according to a seventh exemplary embodiment will be described with reference to FIG. 7.

Figure 7:
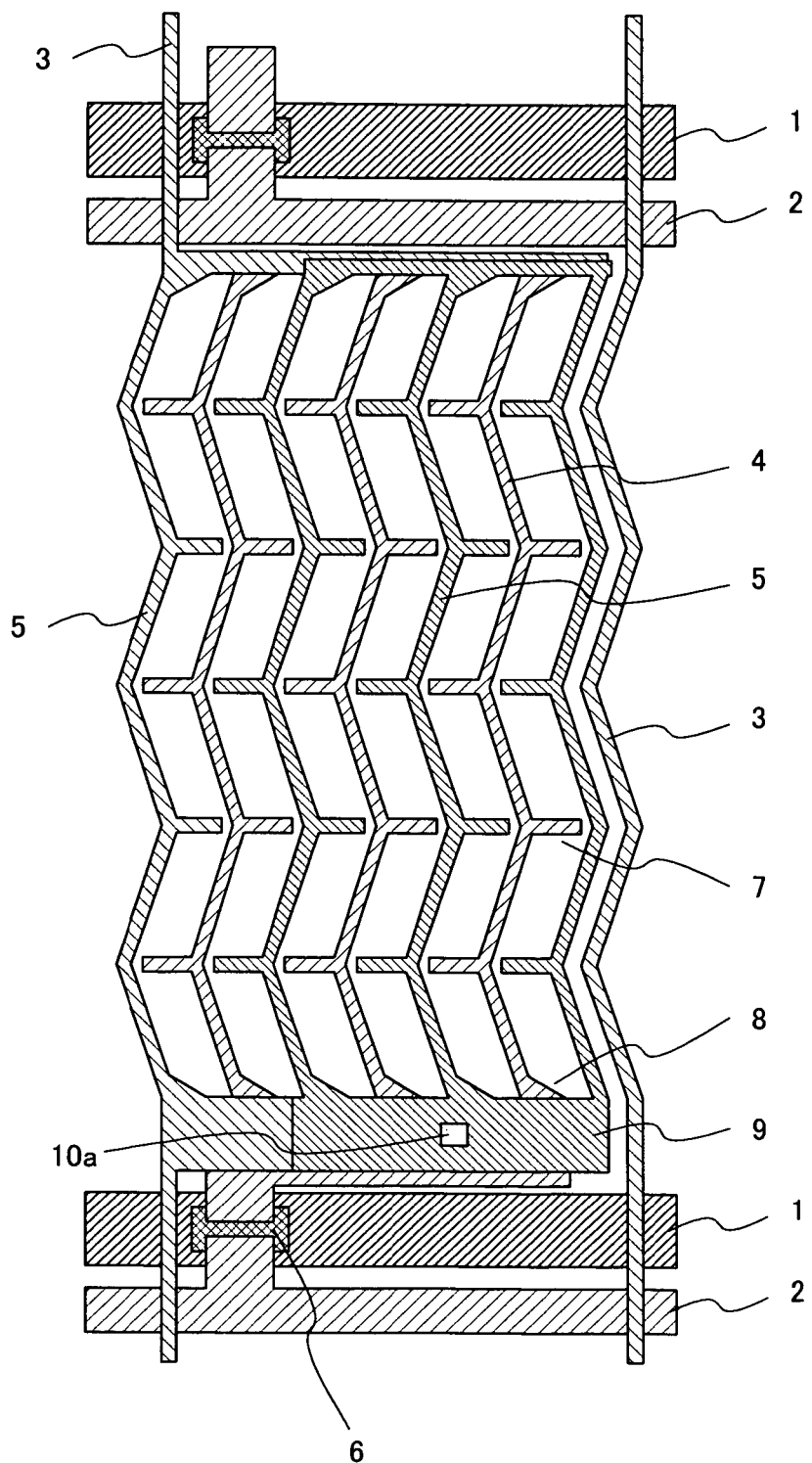
FIG. 7 is a plan view illustrating a pixel of the TFT substrate in the IPS type LCD panel according to a seventh exemplary embodiment.

As shown in FIG. 7, the common wiring 2 is provided in a layer different from the metal layer (in this exemplary embodiment, between the metal layer and the metal film) in the third exemplary embodiment. The counter electrode is connected to the data wiring via the contact hole.

The common voltage is applied to the pixel electrode 4, and the data wiring 3 and the counter electrode 5 are in the same electric potential, a leakage electric field from the data signal does not affect the direction of the liquid crystal molecule even if the conventional shield common wiring is not provided. Since the data wiring 3 acts as the counter electrode 5, one of the counter electrodes 5 can be omitted. The area of the opening can be enlarged to improve the aperture ratio.

In FIG. 7, although an electrode is not provided on the data wiring 3 for purposes of illustration, an electrode of the uppermost layer may be arranged also on the data wiring. FIG. 7 is an exemplification. Insofar as the pixel electrode 4 is formed in the same layer as the common wiring 2, the counter electrode 5 is formed in the uppermost layer, and the common wiring 2 and the pixel electrode 4 are connected to the source and drain electrodes of the TFT 6, respectively, while the counter electrode 5 is connected to the data wiring 3, shape, arrangement, quantity or material of each wiring and electrode can be changed appropriately.

The invention is not limited to the above exemplary embodiments, and the pixel electrode 3 and the counter electrode 4 may have a straight line shape. The domain stabilization pole 7 or the reverse-rotation prevention structure 8 may be omitted. In each above-mentioned exemplary embodiment, the TFT 6 has an inverted stagger type (a bottom gate-type) in which the gate electrode is arranged below the semiconductor layer the source/drain electrode is arranged above the semiconductor layer. However, the TFT may also have a stagger type (a top gate-type) in which the source/drain electrode is arrange below the semiconductor layer and the gate electrode is arranged above the semiconductor layer.

The LCD panel according to the exemplary embodiment includes a liquid crystal sandwiched between the active matrix substrate described above and an opposed substrate.

In the exemplary embodiment, since the data wiring and the counter electrode are in the same electric potential, a leakage electric field from the data signal does not affect the direction of the liquid crystal molecule even if a wiring for electrically shielding the data wiring is not provided. Since the data wiring acts as the counter electrode, the area used as an opening can be secured widely to improve the aperture ratio.

According to the active matrix substrate and the IPS type LCD panel having the active matrix substrate of the exemplary embodiment, the aperture ratio can be made large.

Since the common voltage is applied in the pixel electrode, and the data wiring and the counter electrode are in the same electric potential, a leakage electric field from the data signal does not disturb the direction of the liquid crystal molecule. A wiring for electrically shielding the data wiring is not necessary.

Since the data wiring acts as the counter electrode, one of the counter electrodes can be omitted.

The area used as an opening between the pixel electrode and the counter electrode can be secured widely, then the aperture ratio is high and a bright display characteristic can be obtained.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the claims.

Further, it is the inventor's intention to retain all equivalents of the claimed invention even if the claims are amended during prosecution.

What is claimed is:

1. An active matrix substrate, comprising:
   a substrate;
   a gate wiring formed on the substrate;
   a data wiring formed on the substrate so as to cross the gate wiring;
   a common wiring formed on the substrate extending approximately parallel to the gate wiring;
   a pixel formed in a region surrounded by the gate wiring and the data wiring, including:
     a pixel electrode; and
     a counter electrode arranged alternately with the pixel electrode and connected to the data wiring; and
   a switching element formed in a vicinity of an intersection of the gate wiring and the data wiring, including:
     a first electrode connected to the common wiring; and
     a second electrode connected to the pixel electrode.

2. The active matrix substrate according to claim 1, wherein the pixel electrode is formed in a same layer as the gate wiring and the common wiring, and
   the counter electrode is formed in a same layer as the data wiring.

3. The active matrix substrate according to claim 1, wherein the pixel electrode is formed in a first layer upper than the gate wiring, the common wiring and the data wiring, and is connected to the second electrode via a first contact hole, and
   the counter electrode is formed in a second layer upper than the gate wiring, the common wiring and the data wiring, and is connected to the data wiring via a second contact hole.

4. The active matrix substrate according to claim 3, further comprising:
   a second counter electrode formed in a third layer upper than the data wiring, and in a second region overlapping with the data wiring in a normal direction to the substrate.

5. The active matrix substrate according to claim 1, wherein the pixel electrode is formed in a layer upper than the gate wiring, the common wiring and the data wiring, and is connected to the second electrode via a contact hole, and
   the counter electrode is formed in a same layer as the data wiring.

6. The active matrix substrate according to claim 1, wherein the common wiring is formed in a layer upper than the gate wiring,
   the pixel electrode is formed in a same layer as the common wiring, and
   the counter electrode is formed in a same layer as the data wiring.

7. The active matrix substrate according to claim 1, wherein the common wiring is formed in a first layer upper than the gate wiring;
   the pixel electrode is formed in a second layer upper than the gate wiring, the common wiring and the data wiring, and is connected to the second electrode via a first contact hole, and
   the counter electrode is formed in a third layer upper than the gate wiring, the common wiring and the data wiring, and is connected to the data wiring via a second contact hole.

8. The active matrix substrate according to claim 7, wherein the common wirings neighboring each other are connected along the data wiring.

9. The active matrix substrate according to claim 1, wherein the common wiring is formed in a first layer upper than the gate wiring, the pixel electrode is formed in a same layer as the common wiring, and the counter electrode is formed in a second layer upper than the gate wiring, the common wiring and the data wiring, and is connected to the data wiring via a contact hole.

10. A liquid crystal display panel of an in plane switching type, comprising:
- an active matrix substrate, including:
  - a substrate;
  - a gate wiring formed on the substrate;
  - a data wiring formed approximately orthogonal to the gate wiring;
  - a common wiring formed approximately parallel to the gate wiring;
  - the pixel formed in a region surrounded by the gate wiring and the data wiring, including:
    - a pixel electrode; and
    - a counter electrode arranged alternately with the pixel electrode and connected to the data wiring; and
  - a switching element formed in a vicinity of an intersection of the gate wiring and the data wiring, including:
    - a first electrode connected to the common wiring; and
    - a second electrode connected to the pixel electrode;
- an opposed substrate opposing to the active matrix substrate; and
- a liquid crystal sandwiched between the active matrix substrate and the opposed substrate.

11. A method of manufacturing the active matrix substrate, comprising:
- forming a gate wiring including a gate electrode, a common wiring approximately parallel to the gate wiring, and a pixel electrode approximately orthogonal to the common wiring on a substrate; and
- forming a data wiring approximately parallel to the pixel electrode and passing a vicinity of the gate electrode, a counter electrode connected to the data wiring and arranged alternately with the pixel electrode, and a switching element having a first electrode connected to the common wiring and a second electrode connected to the pixel electrode.

* * * * *